United States Patent [19]

Chainer et al.

[11] Patent Number: 4,513,437

[45] Date of Patent: Apr. 23, 1985

[54] DATA INPUT PEN FOR SIGNATURE VERIFICATION

[75] Inventors: Timothy J. Chainer, Mahopac; Robert A. Scranton, South Salem; Thomas K. Worthington, Tarrytown, all of N.Y.

[73] Assignee: International Business Machines Corporation, Armonk, N.Y.

[21] Appl. No.: 394,043

[22] Filed: Jun. 30, 1982

[51] Int. Cl.³ .............................................. G06K 9/24
[52] U.S. Cl. ........................................ 382/3; 382/59; 73/432 A
[58] Field of Search ................................. 382/3, 59; 310/329–332; 324/162; 73/432 A; 340/707

[56] References Cited

U.S. PATENT DOCUMENTS

| | | | |
|---|---|---|---|
| 3,528,295 | 9/1970 | Johnson et al. | 382/3 |
| 3,699,517 | 10/1972 | Dyche | 382/3 |
| 3,962,679 | 6/1976 | Engelbrecht | 382/3 |
| 3,983,535 | 9/1976 | Herbst et al. | 382/3 |
| 4,078,226 | 3/1978 | EerNisse et al. | 382/59 |
| 4,128,829 | 12/1978 | Herbst et al. | 382/3 |
| 4,131,880 | 12/1978 | Siy et al. | 382/59 |
| 4,142,175 | 2/1979 | Herbst et al. | 382/59 |
| 4,263,592 | 4/1981 | Takahashi et al. | 340/707 |
| 4,345,239 | 8/1982 | Elliott | 382/3 |

OTHER PUBLICATIONS

EerNisse et al., "Piezoelectric Sensor Pen for Dynamic Signature Verification", *Conf. 1977 Int. Electron Devices Meeting*, Wash., D.C., 12-1977, pp. 473-476.
IBM Technical Disclosure Bulletin, entitled "Optimal Designs of Instrumented Pens for Signature Verification", by J. S. Lew, vol. 21, No. 8, p. 3415, Jan. 1979.

*Primary Examiner*—Leo H. Boudreau
*Attorney, Agent, or Firm*—Roy R. Schlemmer

[57] ABSTRACT

A writing implement having special applicability for use as a pressure and acceleration sensitive element for use in a Signature Verification System. The pen structure includes both a writing implement for making a visible record and also includes unique transducer structures for providing both acceleration and pressure data to a remotely located verification system. The pressure sensing element is axially mounted within the pen and produces pressure signals due to axial pressure on the pen tip as an individual writes. The accelerometer structure comprises a hollow tubular piezoelectric member supported at one end and having four circumferentially disposed electrodes on the outer surface thereof, which are appropriately interconnected to produce two orthogonal acceleration component signals $A_x$ and $A_y$.

10 Claims, 7 Drawing Figures

DATA INPUT PEN FOR SIGNATURE VERIFICATION

FIELD OF THE INVENTION

The present invention relates generally to the area of acceleration and pressure sensitive detection devices which are particularly useful to detect or monitor changes in pressure and/or acceleration produced by the device as a result of relative movement between the device and some surface. The invention has particular utility in the field of Signature Verification where it is desired that the identity of an unknown person be unequivocally established by means of comparing his signature with a previous known signature. The special writing implement of the present invention may readily be utilized in a Signature Verification System for producing signals representative of the pressure of the pen upon for example, a writing surface and for producing acceleration signals representative of the movement of the pen across a writing surface when a person is for example, writing his signature.

BACKGROUND OF THE INVENTION

There has always been a need in society for verifying a person's identity for a variety of purposes. Modern day scientific technology has adopted the widespread use of computers and related mechanisms for the purposes of giving credit, performing electronic funds transfer, etc. In all facets of the financial community including the retail industry, securities industry, banking, etc., where sums of money, securities and/or materials are to be transferred between owners based on the reliance of one person on the purported identity of another. Electronic systems including various cryptographic instrumentalities together with secret identity numbers or keys provide a certain amount of security, however, the amount of security is predicated upon the degree of secrecy with which one is able to secure his own special identification key. Obviously once a person's key is learned by another, presumably unauthorized person, the other person may falsely assume his identity for a wide variety of electronic applications.

Identity verification by means of signatures has long been known in the art, however, most known systems have various shortcomings. Simply matching the appearance of two signatures is not satisfactory as expert forgers can usually duplicate the appearance of a person's signature as well as the person himself. The result of this is that when an expert forger is involved even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al both disclose systems which make the concept of personal identification via computer based signature analysis practical. These patents as well as others known in the art compare electrical signals resulting from a person's unique signature dynamics. The two above referenced patents both utilize acceleration and pressure data in making the requisite comparisons and analysis. In such systems the actual analysis or correlation is performed in an electronic computer programmed to perform the requisite correlation algorithm. However, a principal problem with such a system is to provide a pickup device or pen which is durable, has adequate sensitivity for the purpose and which is relatively inexpensive to manufacture as ideally such a pen would be required at every location where it was desired to perform the verification operation.

U.S. patent application Ser. No. 161,483, filed June 20, 1980, entitled "Apparatus for Determining Pen Acceleration," assigned to the same assignee as the present invention, discloses a data input pen for use with a Signature Verification System such as described in the above. The disclosed pen utilizes a special structure for detecting acceleration forces involving variable capacitance transducers. The structure of this patent, although measuring the same forces, discloses a totally different structure from that utilized in the present invention.

BACKGROUND ART

An article by J. S. Lew entitled "Optimal Designs of Instrumented Pens for Signature Verification," January 1979, of the IBM Technical Disclosure Bulletin, Vol. 21, No. 8, page 3415, discloses schematically a number of multi-accelerometer pen designs which are so arranged as to be significantly different from that of the herein disclosed design.

U.S. Pat. No. 3,962,679 of Engelbrecht et al entitled "Handwriting Identification Technique," discloses a handwriting technique which utilizes writing speed as a signature identification means and which neither discloses nor suggests the acceleration and the pressure pick-up device set forth herein.

U.S. Pat. No. 3,699,517 to J. W. Dyche entitled "Handwriting Authentication Technique," discloses an apparatus and method for signature verification which computes among other things both velocity and acceleration of a pen point but which however neither discloses nor suggests the particular form of detection device or pen disclosed herein.

U.S. Pat. No. 4,142,175 to Herbst et al entitled "Pressure Sensing Device and Transducer Arrangement," assigned to the same assignee of the present invention, discloses a sensing device specifically designed to detect orthogonal acceleration components and also derived axial pressure signals. However the pen configuration of this patent is significantly different from that disclosed and forming a part of the present invention, as both the accelerometer and pressure transducers are united within the pen structure in a significantly different manner.

U.S. Pat. Nos. 4,078,226 and 4,131,880 both show pens specifically adapted for inputting data into a Signature Verification System but which bear little resemblance to the acceleration/pressure pen of the herein disclosed invention.

U.S. Pat. No. 4,263,592 is exemplary of a class of pens designated as "light pens" for inputting data into an electronic computing system via a CRT tube.

SUMMARY OF THE INVENTION

It is the primary object of the present invention to provide a pen-like sensing element for inputting both acceleration and pressure data into an electronic Signature Verification System.

It is another object of the invention to provide such a device which utilizes uncomplicated readily available and inexpensive piezoelectric detection devices for obtaining the required input data.

It is a still further object of the invention to provide such a pen assembly having a unique accelerometer mounting structure which is simple and inexpensive and provides two such acceleration dependent signals indicative of orthogonal acceleration forces on said pen.

It is a further object of the invention to provide such a pen assembly having a unique piezoelectric pressure sensing device for producing signals proportional to the axial pressure on the pen tip.

It is another object of the invention to provide such a pen wherein ink cartridges may be readily replaced without affecting the overall electronic portion of the assembly.

It is a final object of the invention to provide such a pen assembly which is compact, durable, and inexpensive to manufacture and at the same time is extremely sensitive and capable of producing all the data required of the attached verification system.

The objects, features and advantages of the present invention are realized by the herein disclosed pen structure wherein the pen produces signals which in effect measure the acceleration along two orthogonal axes perpendicular to the pen axis and produce a signal proportional to pressure applied to the pen tip substantially parallel to the pen axis. The two acceleration signals are produced by a hollow piezoelectric beam transducer disposed within the pen substantially parallel to the axis of said pen and cantilevered to a support means which is substantially perpendicular to the pen axis. The pressure signal is produced by a second hollow tubular piezoelectric transducer similarly mounted with the pen. The second transducer is cantilevered from the pen body at one end and supports the pen tip at the other whereby pressure signals are produced when axial pressure is applied to the pen tip. Additionally, adequate space is available within the pen for various miniaturized signal processing circuits for both the acceleration channels and pressure channel. Impedance matching circuits are included so that a low impedance highly flexible cable may be utilized to attach the pen to the computing system whereby the low output impedance makes the data signal independent of flexing of the cable. Thus, a very thin flexible cable may be used whereby the signature produced is affected minimally by the presence of said cable.

DESCRIPTION OF THE DISCLOSED EMBODIMENT

Having described the overall features and advantages of the herein disclosed signature dynamics input device, there will now follow a detailed description of the presently disclosed preferred embodiment thereof. It will be noted in the subsequent description that the present input device is shown as actually being a pen with an appropriate ball point ink cartridge, etc. However, it should be understood that it would not be absolutely necessary to use precisely the same type of marking apparatus or even to have an actual mark made at all. For certain secrecy applications the latter might be desired. For convenience of reference in the subsequent description, the overall apparatus will simply be referred to as a data input pen.

Figure 1:
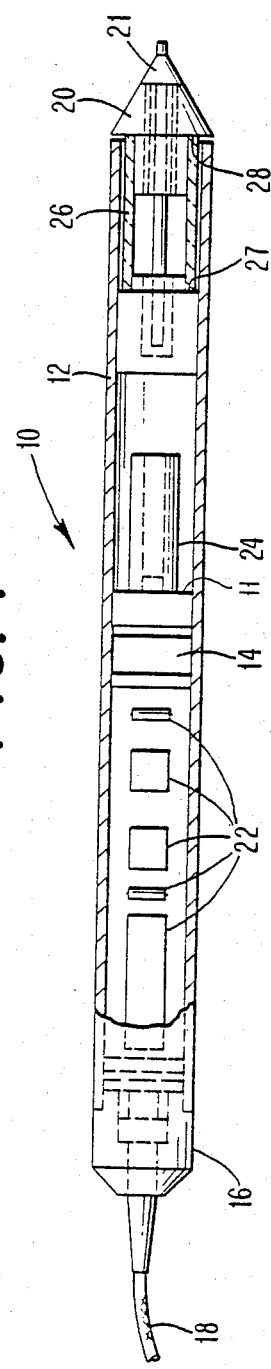
FIG. 1 comprises a top view with the outer casing partly broken away of the special purpose writing implement incorporating the features of the present invention.
Figure 2:
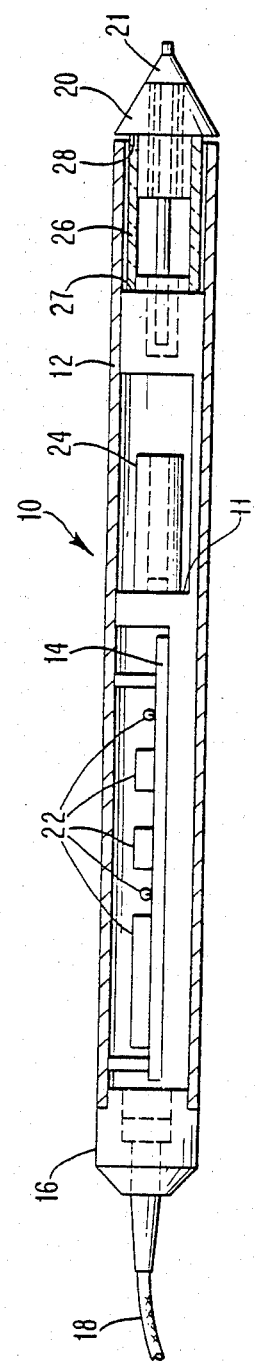
FIG. 2 is a longitudinal cross-sectional view of the special purpose writing implement shown in FIG. 1.

Referring to FIGS. 1 and 2 which are top and side views respectively, of the presently disclosed preferred embodiment. The overall organization of the data input pen may be clearly seen.

In the FIGURE, the overall structure 10 includes an outer casing 12 constructed of conductive plastic, metal, or the like. The outer casing is preferably tubular and fits over a base or support structure 14. The conductive outer casing 12 serves the function of shielding the circuitry from electromagnetic noise. The pen body including the casing 12 and support member 14 is completely sealed making it corrosion resistant.

Figure 6:
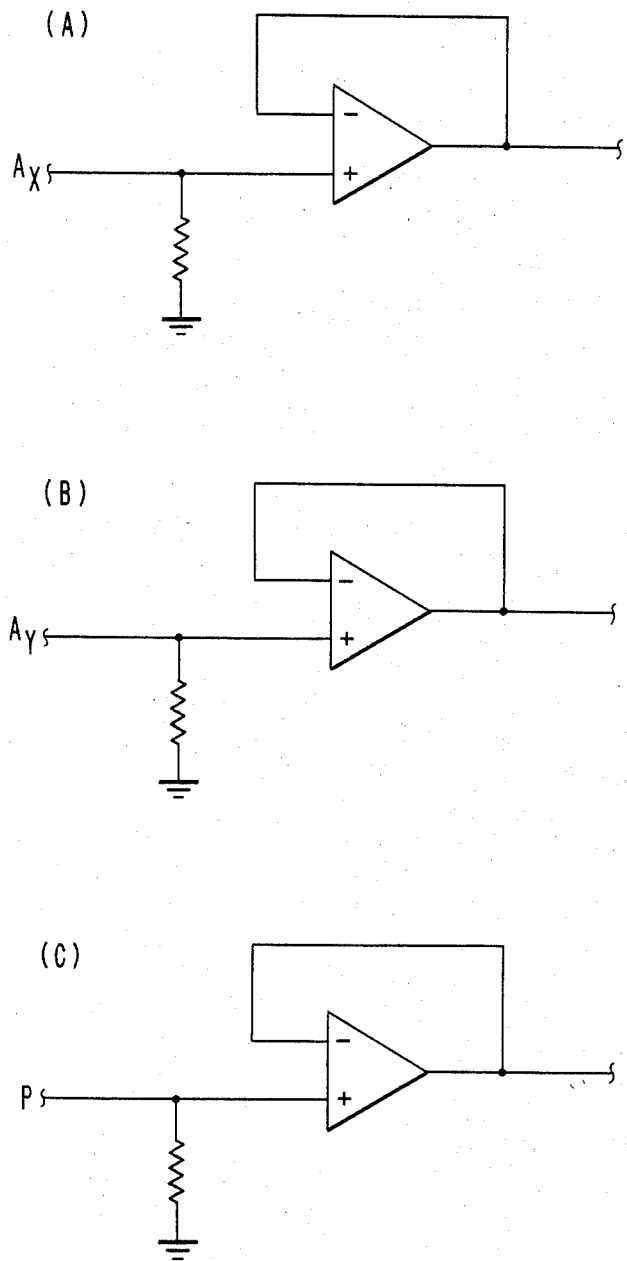
FIGS. 6A-C are functional schematic diagrams of the electronic circuitry of the two acceleration channels and the pressure channel respectively.

One end of the body 14 is adapted to receive a connector assembly 16, which serves to connect the pen to a data acquisition terminal via cable 18. A tip holder 20 is attached to the end 28 of the pressure transducer 26. Tip holder 20 is threaded to receive a pen type cartridge 21 which would normally be a standard ball point cartridge suitably threaded to fit into the opposite end of the overall pen structure from the cable as will be described subsequently. An amplifier board 22 is shown mounted within the pen body adjacent to the connector and would contain the various amplifiers and impedance matching circuitry designated in the functional systematic diagram of FIGS. 6A through C. The specific configuration of this circuitry does not constitute a part of the present invention and is only shown generally for illustrative purposes.

A two axis accelerometer 24 is mounted substantially intermediately of the pen and is cantilevered at one end from an appropriate surface 11 on support structure 14 which is substantially perpendicular to the axis of the pen. The specific details of the accelerometer will be described subsequently with respect to FIG. 3, however, the accelerometer is generally a hollow tubular piezoelectric device poled to produce appropriate output signals due to transverse deflection forces applied thereto caused by movement of the pen. A small weight could be located at the opposite end of said accelerometer from the end at which it is supported however, in practice this has not been found necessary.

The pressure sensitive device or transducer 26 is located at the end of the pen structure adjacent to the pen tip and is also a hollow tubular piezoelectric member cantilevered from the pen body at one end 27 and adapted to receive the tip holder 20 and threaded pen cartridge 21 at the other end 28. The overall pen structure has been embodied in a device substantially the same size as a conventional ball point pen.

Figure 3:
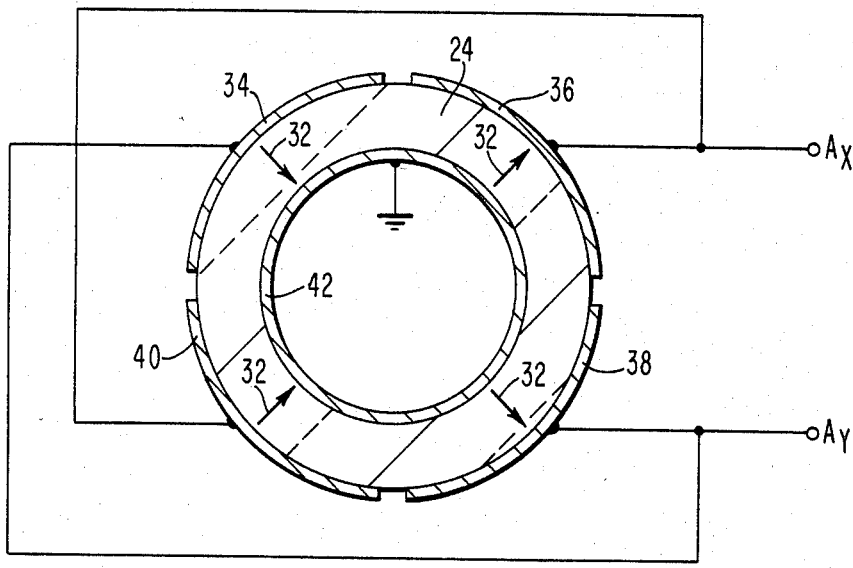
FIG. 3 comprises a transverse cross-sectional view of the tubular accelerometer structure incorporated in the device of FIGS. 1 and 2.

Referring now specifically to FIG. 3 there is shown a cross-sectional view of the hollow tubular cantilevered beam type accelerometer. This type of accelerometer structure has long been known in the art as exemplified in U.S. Pat. No. 3,073,914 and no claim for novelty for the accelerometer structure per se is made herein. The novelty of the present invention is believed to reside in the use of such a piezoelectric accelerometer in a data input pen as disclosed herein. The accelerometer comprises a tubular piezoelectric body 24 poled as shown by the arrows 32. Four circumferentially spaced electrodes in combination with an interior ground plane or electrode 42 provide the means by which the appropriate acceleration signals $A_x$ and $A_y$ are detected when a force is applied transverse to the axis of said tube due to motion of the pen. As will be appreciated, acceleration forces cause the tube to be deflected or to bend very slightly due to the mass of the tube. The electrodes 36 and 40 are coupled together and produce the signals $A_x$ as indicated, and similarly, electrodes 34 and 38 are connected together to produce the signals $A_y$. As indicated the four electrodes 34 through 40 are of equal arc length and extend for substantially the length of the piezoelectric tube 30. The electrodes 34 through 42 are made up of an appropriate film material such as nickel or silver. The poling of the piezoelectric material as shown in FIG. 3 decreases the pyroelectric effect in the material and allows a single ended amplifier configuration for signal amplification. With an input resistor of 50 meg-ohms, the accelerometers have a substantially flat frequency response from 2.0 Hz to the first resonance at 1200 Hz. The sensitivity is approximately 0.01 g.

Figure 4A:
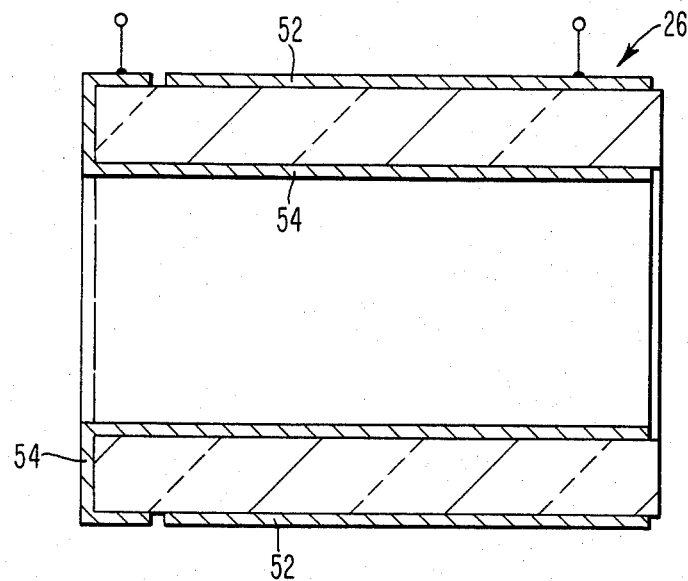
FIG. 4A is a longitudinal cross-sectional view of the tubular pressure transducer incorporated in the writing implement illustrated in FIGS. 1 and 2.

The pressure sensitive device 26 is, as stated previously, a piezoelectric tube also and is shown in longitudinal cross section in FIG. 4A. The tube 26 is cantilevered at one end 27 to the pen body. The tip holder 20 is attached at the other end 28. The tip holder 20 is threaded to receive the pen tip 21.

Figure 4B:
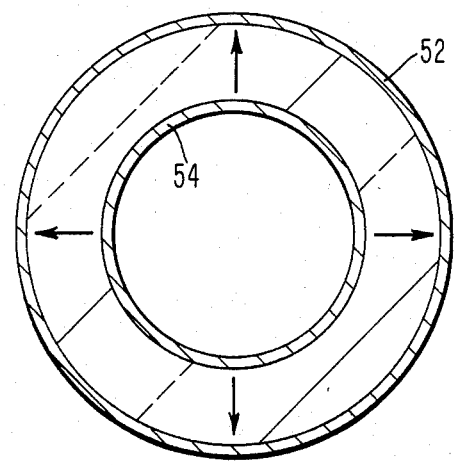
FIG. 4B is a transverse cross section of the pressure transducer of FIG. 4A.

The pressure sensitive device is radially poled as shown in the transverse cross-sectional view of FIG. 4B and will produce a pressure signal on electrodes 52 and 54 when pressure is applied parallel to the axis of the pen. Referring to FIG. 4A it will be noted that the inner electrode 54 extends out over one end of the tube and for a short distance along the outer surface of the tube. This is for the purpose of making an electrical contact with the electrode as shown. The pressure causes compression of the piezoelectric tube and produces the requisite pressure signals. The tubular configuration of the pressure transducer provides axial symmetry. As stated previously, the overall pen design allows clearance between the tube 26 and outer casing 12. Further it is designed for easy replacement of the pen tip. Also the pressure sensor has no mechanical hysteresis.

The amplifier board 22, shown in FIGS. 1 and 2, as stated previously do not specifically form a part of the present invention but is exemplary of circuitry capable of readily being mounted within the pen and used for impedance matching of the transducers to the data acquisition system. Also as stated previously, the low output impedance of the amplifiers utilized makes the data signals insensitive to the flexing of the cable and thus allows a very light weight flexible cable to be used which interferes minimally with the written signature. The circuit configurations shown in FIGS. 6A through 6C comprises simple operational amplifiers and their associated input resistors. The input resistor is used to adjust the low frequency response of the transducers.

Figure 5:
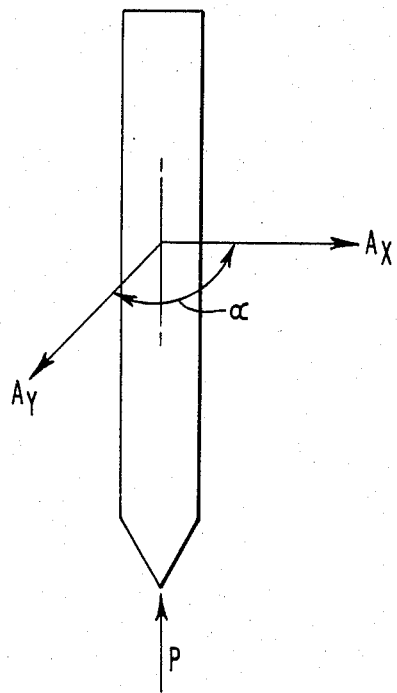
FIG. 5 comprises a diagrammatic representation of the forces acting upon and detected by the special purpose writing implement of the present invention.

FIG. 5 is a simplified diagrammatic illustration of the forces acting on the present data input pen which are measured by the two piezoelectric transducers 24 and 26. As is apparent from the figure the acceleration forces $A_x$ and $A_y$ are those orthogonal forces lying essentially in a plane perpendicular to the pen axis. The pressure transducer conversely measures pressure changes along or parallel to the pen axis.

It should be clearly understood that in the preferred embodiment of the pen the two acceleration forces detected are orthogonal, i.e., at 90°, however, the verification system will work and thus the pen could be designed to produce two forces which are transverse but measure acceleration components which have an included angle ($\alpha$ in FIG. 5) substantially less then 90°.

The disclosed embodiment of the present data input pen device comprises a preferred realization of the present pen. It must be understood that certain obvious modifications could be made without departing from the spirit and scope of the invention.

For example the hollow tubular piezoelectric accelerometer could be rectangular in cross section rather than circular in cross section. Also, the accelerometer could be individual blade type piezoelectric transducers individually mounted orthogonally on, for example, the surface to which the tubular transducer is mounted. It is however, to be noted that these acceleration sensitive transducers are mounted on the pen body per se and are mechanically isolated from any flexural components of the pen assembly as in the pen of U.S. Pat. No. 4,028,226. Further it would not be necessary to place the electronic circuitry including the amplifier boards within the pen however, certain advantages accrue therefrom as noted. Also, various subassemblies including the amplifier and connector assembly, the accelerometer structure, and the pressure channel and pen tip structure, could conceivably be made separately and simply adapted to be screwed together in serial fashion. However, it is noted that the present construction is believed to represent an optimal configuration. The overall pen design disclosed is adaptable to low cost injection molding techniques for production and the pen cartridges are easily replaceable.

INDUSTRIAL APPLICABILITY

The present data input pen assembly is particularly adapted for use with a Signature Verification System such as set forth in previously referenced U.S. Pat. Nos. 3,983,535 and 4,128,829 which require continuous acceleration and pressure data for use in their verification algorithms. The disclosed pen assembly is both durable and susceptible of low cost production techniques both of which are necessary to the ultimate utilization of such a device in commercial applications such as banks, certain access applications and the like wherein the devices would be subject to both rough usage and possible theft.

The availability of such a data input pen device is believed necessary before Signature Verification techniques can become commercially feasible.

Having thus described our invention, what we claim as new, and desire to secure by Letters Patent is:

1. A data input pen particularly adapted for use within an electronic Signature Verification System comprising an elongated body member having a writing tip at one end and means at the other end for connecting the pen in signal transmitting relationship with a host computer, means within said pen for producing signals representative of transverse acceleration forces acting upon said pen, said last named means comprising at least two orthogonally disposed piezoelectric transducer elements cantilevered from a suitable support surface perpendicular to the pen axis and extending in a direction parallel to the pen axis, said transducer elements having electrodes on opposite surfaces of their piezoelectrically active regions and extending for substantially the length of said elements, means for interconnecting electrodes on opposite sides of said elements to detect quadrature acceleration signals produced by said transducer elements.

2. A data input pen as set forth in claim 1, wherein said two piezoelectric transducer elements are included within a single hollow piezoelectric tube having at least two circumferentially segmented electrodes located on the outer surface of said tube and another circumferential electrode located on the inner surface of said tube, the other electrode comprising a ground plane and being interconnected with each of said circumferential electrodes to produce the required quadrature acceleration signals.

3. A data input pen particularly adapted for use within an electronic Signature Verification System comprising an elongated body member having a writing tip at one end and means at the other end for connecting the pen in signal transmitting relationship with a host computer, means within said pen for producing signals representative of orthogonal acceleration forces acting upon said pen, said last named means comprising a hollow tubular piezoelectric transducer cantilevered from a suitable support surface to lie along an axis parallel to the pen axis, said transducer having at least four circumferentially segmented electrodes on one surface of said tube and extending for substantially the length of said tube, means for interconnecting pairs of electrodes on opposite sides of said tube to detect quadrature acceleration signals produced by said pairs of electrodes.

4. A data input pen as set forth in claim 3, wherein said four circumferentially segmented electrodes are located on the outer surface of said tube and a fifth circumferential electrode is located on the inner surface of said tube, the fifth electrode comprising a ground plane and being interconnected with said two pairs of interconnected electrodes to produce the required quadrature acceleration signals.

5. A data input pen as set forth in claim 2, wherein said hollow piezoelectric tube is substantially coaxial with said body member, the support surface therefore being substantially perpendicular to the pen axis.

6. A data input pen particularly adapted for use with an electronic Signature Verification System comprising an elongated body member having a writing tip at one end and means at the other end for connecting the pen in signal transmitting relationship with a host computer, means within said pen located adjacent to said writing tip for producing signals representative of axial pressure applied to said pen via said writing tip, said last named means comprising a hollow tubular piezoelectric transducer cantilevered at one end from a support surface at one end of said pen and coaxial therewith, and means at the opposite end of said transducer for mounting said writing tip directly to said transducer, two circumferential electrodes one on the inner surface, the other on the outer surface of said pressure transducer for producing signals proportional to the pressures applied to said transducer via said writing tip.

7. A data input pen particularly adapted for use within an electronic Signature Verification System, comprising an elongated body member having a writing tip at one end and including means for transmitting signals produced by said pen to a host computer, first means within said pen for producing signals representative of orthogonal acceleration forces acting transversely upon said pen and second means for producing signals representative of axial pressure applied to said pen via said pen tip, said first means comprising a first hollow tubular piezoelectric transducer, coaxial with said pen and cantilevered from a suitable support surface, said first transducer having electrodes associated therewith for producing said signals representative of orthogonal acceleration forces applied to said pen, said second means comprising a second hollow piezoelectric transducer supported and cantilevered at one end from the end of said pen adjacent to said writing tip and coaxial therewith, said second transducer including means for receiving the writing tip at its other unsupported end and electrode means associated therewith for detecting signals produced by said second transducer representative of axial pressures applied to said pen via said writing tip.

8. A data input pen as set forth in claim 7, including means within said body member for mounting electronic signal processing circuitry for optimizing the signals produced by both said first and second transducer means.

9. A data input pen as set forth in claim 8 wherein said electronic circuitry includes amplifier and impedance matching means.

10. A data input pen as set forth in claim 8 wherein said body member includes an elongated base structure providing means for mounting said first and second transducer means coaxially with the overall pen assembly and for mounting said electronic circuitry, and an outer tubular conductive cover which is adapted to fit tightly over said base structure but having sufficient clearance around said second transducer means to allow the pen tip to axially move the unsupported end of said cantilevered second transducer means as pressure is applied to said pen tip.

* * * * *